Aug. 14, 1928.

W. O. KENNINGTON 1,680,549

VACUUM BRAKE

Filed Nov. 16, 1927    2 Sheets-Sheet 1

Inventor
William O. Kennington

By Blackmore, Spencer & Fish
Attorneys

Aug. 14, 1928.  W. O. KENNINGTON  1,680,549
VACUUM BRAKE
Filed Nov. 16, 1927   2 Sheets-Sheet 2

Inventor
William O. Kennington
By Blackmore, Spencer & Hurd
Attorneys

Patented Aug. 14, 1928.

1,680,549

UNITED STATES PATENT OFFICE.

WILLIAM O. KENNINGTON, OF LONDON, ENGLAND.

VACUUM BRAKE.

Application filed November 16, 1927, Serial No. 233,606, and in Great Britain September 11, 1926.

This invention relates to the control of power-operated brakes or other mechanism in motor vehicles and has for its object to provide methods and means whereby a simplification in control operations is secured.

The invention will be described hereinafter as applied by way of example to the control of brake mechanism, it being understood that it may be applied to other power-operated mechanism of vehicles.

The invention consists in control means for power-operated mechanism including an auxiliary member embodied in or disposed adjacent an internal combustion accelerator member whereby positive movement of the driver's hand or foot in an additional and immediately adjacent path to that traced during normal operation of the accelerator member actuates mechanism controlling the power applied to the power-operated mechanism.

The invention further consists in control means for power-operated mechanism as set forth above wherein said auxiliary member comprises a stirrup associated with an accelerator pedal lever which is connected both to the engine throttle lever and to the power-controlling mechanism by way of one-way connections.

The invention further consists in control means for power-operated mechanism as set forth above wherein said auxiliary member comprises a stirrup associated with an accelerator pedal lever connected to the engine throttle valve, which latter in addition to its normal function is rendered capable of controlling the power derived from the engine suction.

The invention may be embodied in structure wherein, in place of the stirrup, other auxiliary members may be employed for actuating the power controlling mechanism.

The invention further consists in control means for power-operated mechanism as set forth above wherein a reaction upon the auxiliary member depending upon the force exerted by the power-operated mechanism is produced.

The invention also consists in control means for power-operated mechanism substantially as hereinafter described with reference to any of the accompanying drawings.

Referring to the accompanying diagrammatic drawings.

Figure 1:
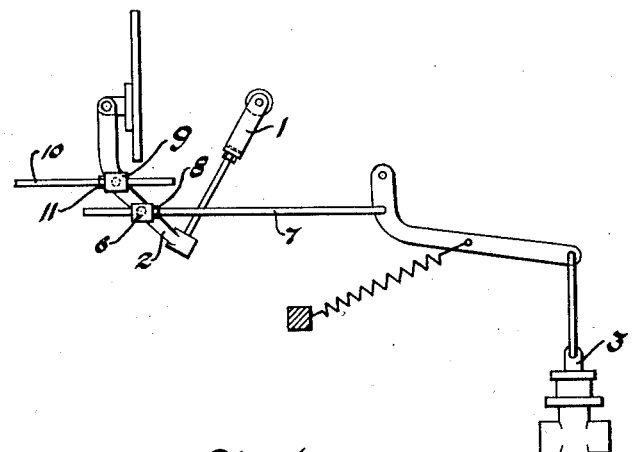
Figure 1 illustrates diagrammatically one convenient arrangement in accordance with the present invention.

In carrying the invention into effect in one convenient form by way of example illustrated in Figure 1 as applied to the control of brake mechanism of motor vehicles operated from suction derived from the induction system of the engine, I replace the normal accelerator pedal by a stirrup 1 which will enable the pedal lever 2 to be lifted by the driver's foot beyond its normally "closed" position.

I arrange the accelerator pedal linkwork so that when the lever 2 is lifted beyond the position it occupies in Figure 1 it serves to operate the valve device 3, thereby putting the brake-operating contrivance (e. g. a cylinder 4 and piston 5) into operation as described in my United States application, Ser. No. 147,130, filed Nov. 8, 1926, for brake mechanism operated by suction. This is effected by providing a block 6 loosely pivoted upon the lever 2, the rod 7 carrying a stop 8 and passing freely through the block 6. A similar block 9 is associated with a rod 10 and stop 11, the rod 10 being connected to the throttle lever (not shown). By this means operation of the throttle by depressing the stirrup 1 can take place without bringing the valve device 3 into operation at all and likewise operation of the latter can be brought about without further movement of the throttle beyond its "closed" position.

Suitable springs (not shown) may be provided to urge the accelerator lever 2 into its normally "closed" position so that if the foot be moved from the pedal the latter will always automatically assume the position occupied in Figure 1.

It will be appreciated that according to this arrangement control of the motor vehicle is extremely simple, since acceleration and normal running of the engine and progressive braking are in immediate control without removal of the driver's foot from the accelerator pedal.

In some cases it is desirable that a certain measure of progressive reaction pressure be applied to the stirrup in order that the driver may more readily gauge the braking effort exerted at any moment. A convenient means of incorporating this action is illustrated in Figure 2 wherein a lever 12 is interposed between the connecting rod 13 and the brake rod 14, this lever being connected by a spring 15 at its remote end with the lever 2.

In this form of the invention the pull of rod 13 is divided by the lever 12, being transmitted mainly to the brake through rod 14 but being in part effective through spring 15 upon the pedal 2 against the pull being exerted upon this pedal by the foot in the stirrup.

In some cases when only a very slight reaction effect is desired the effective area of the valve mechanism 3 may be reduced so that the force to be overcome in raising this member, say in Figures 1, 4, 5 and 6, is reduced. This detail is not a part of this invention but is disclosed and described in my application for vacuum brake Ser. No. 194,128, filed May 25, 1927.

Figure 2:
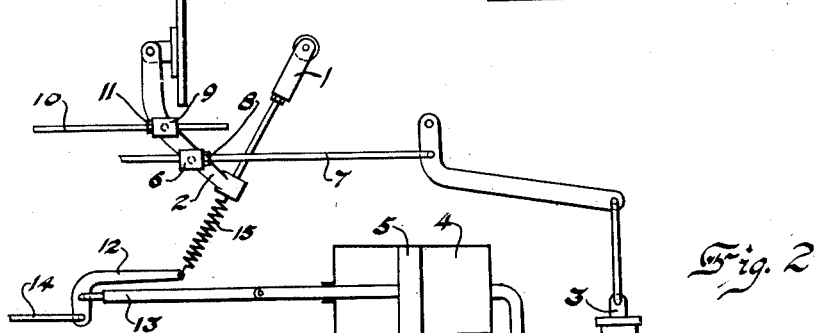
Figure 2 illustrates also diagrammatically a modification wherein reaction effect is incorporated.
Figure 3:
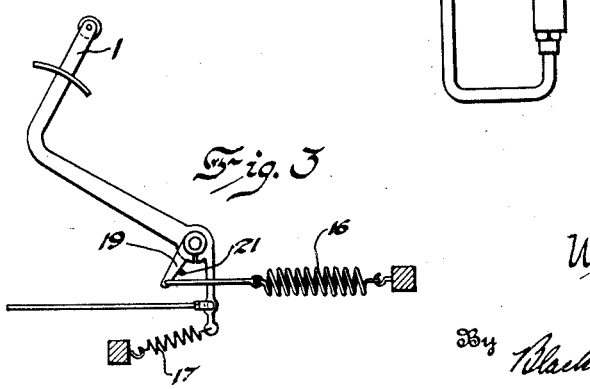
Figure 3 is a further diagrammatic modification not incorporating reaction effect.

According to the modification illustrated in Figure 3 a stirrup is attached to the pedal shown in Figure 2 of the drawings accompanying my U. S. Patent 1,541,266 for vacuum operated brake, thus enabling the throttle itself to be operated beyond its "closed" position. In this case the spring 16 is made stronger than the spring 17 so that the arm 19 may normally rest against the stop 21.

Figure 4:
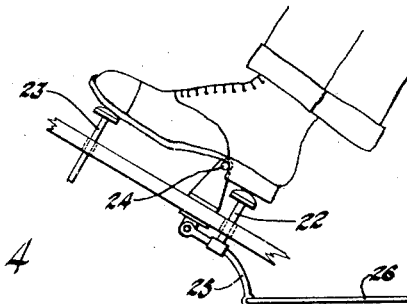
Figures 4, 5 and 6 illustrate diagrammatically three further modifications.

According to a further modification illustrated in Figure 4 a heel- and toe action is utilized to operate the brake-operating plunger 22 and throttle-operating plunger 23, a fixed or adjustable fulcrum rod 24 for the instep being provided as shown.

The plunger 22 actuates an arm 25 which is connected through a link 26 and bell crank lever 27 to the valve device 3.

Figure 5:
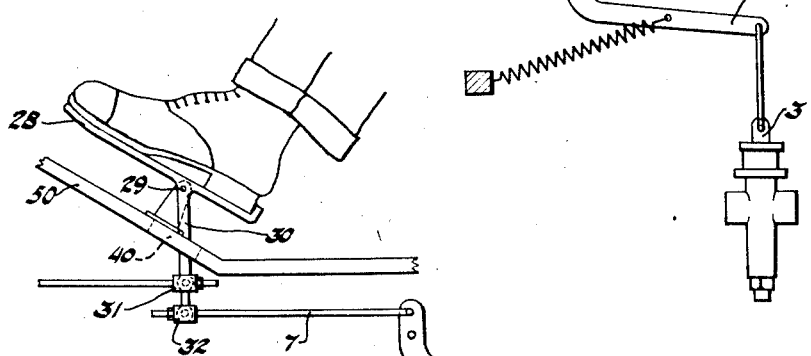

The modification illustrated in Figure 5 embodies a foot plate 28 hinged at 29 and bearing an arm 30 carrying pivoted blocks 31 and 32 which cooperate with rods 10 and 7 respectively in similar fashion to that depicted in Figure 2. A suitable slot 40 is formed in the toe board 50 to admit of the necessary rocking movement of the arm 3.

Instead of providing a stirrup on the accelerator pedal a further pedal or lever may be disposed adjacent the accelerator pedal so as to be operable by the foot without removing the latter from the accelerator pedal.

Figure 6:
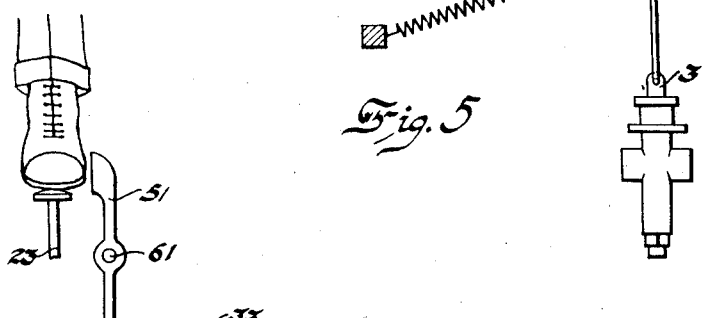

Such an arrangement is illustrated in Figure 6 wherein 23 represents a normal accelerator pedal lever adjacent which is mounted a lever 51 pivoted at 61 and connected at its remote end to valve mechanism 3 through a link 33 and bell crank lever 34. By this means lateral movement of the foot will operate the valve mechanism 3 without affecting the throttle, while vertical movement will operate the throttle without affecting the valve mechanism 3.

Having now particularly described and ascertained the nature of my said invention and in what manner the same is to be performed, I declare that what I claim is:—

1. Control means for power operated mechanism including an auxiliary member associated with an internal combustion engine accelerator member whereby positive manual movement in an additional and immediately adjacent path to that traced during normal operation of the accelerator member actuates mechanism controlling the power applied to the power operated mechanism, and wherein said auxiliary member comprises a stirrup associated with an accelerator pedal, which latter is connected both to the engine throttle lever and to the power controlling mechanism by one way connections.

2. In combination, means for controlling the fuel supply of a motor, means for controlling a brake, manually operable mechanism operable in two directions, in one direction actuating the fuel supply means and in the other direction actuating the brake control means, said brake control means including a floating lever, a tension link connected to one arm of the lever for applying the brake and resilient means connecting the other arm of the lever to the manually operable means to react on the latter in proportion to the force of brake application.

In testimony whereof I affix my signature.

WILLIAM O. KENNINGTON.